United States Patent [19]
Valyi

[11] 3,939,239
[45] Feb. 17, 1976

[54] METHOD OF MAKING LINED ARTICLES

[76] Inventor: Emery I. Valyi, 5200 Sycamore Ave., Riverdale, N.Y. 10471

[22] Filed: June 10, 1974

[21] Appl. No.: 477,751

Related U.S. Application Data

[60] Continuation-in-part of Ser. No. 343,498, March 21, 1973, abandoned, which is a division of Ser. No. 186,984, Oct. 6, 1971, Pat. No. 3,787,157, which is a continuation-in-part of Ser. Nos. 71,734, Sept. 14, 1970, Pat. No. 3,717,544, and Ser. No. 100,050, Dec. 21, 1970, Pat. No. 3,719,735.

[52] U.S. Cl. .............. 264/89; 264/37; 264/92; 264/97; 425/DIG. 209; 425/DIG. 234
[51] Int. Cl.² ............. B29C 17/07; B29F 1/10
[58] Field of Search ........... 264/89, 90, 92, 93, 94, 264/97, 247, 250, 255, 265, 278, 37; 425/129, 242 B, 324 B, 387 B, DIG. 209, 234

[56] References Cited
UNITED STATES PATENTS

| | | | |
|---|---|---|---|
| 2,953,814 | 9/1960 | Mumford | 264/153 |
| 2,965,932 | 12/1960 | Knowles | 264/328 X |
| 3,054,714 | 9/1962 | Johnston | 264/90 X |
| 3,122,598 | 2/1964 | Berger | 264/247 |
| 3,187,069 | 6/1965 | Pincus et al. | 264/90 X |
| 3,240,851 | 3/1966 | Scalora | 264/153 |
| 3,247,550 | 4/1966 | Haines, Jr. | 264/275 X |
| 3,349,155 | 10/1967 | Valyi | 264/97 |
| 3,358,062 | 12/1967 | Lemelson | 264/97 X |

Primary Examiner—Jan H. Silbaugh
Attorney, Agent, or Firm—Robert H. Bachman

[57] ABSTRACT

A method of making lined, hollow plastic articles wherein a parison is formed on a core in a parison mold by molding plastic around the core in a parison mold cavity and subsequently expanding the parison in a blow mold. A preformed plastic sleeve is formed on the core prior to molding plastic around the core in the parison mold cavity.

7 Claims, 5 Drawing Figures

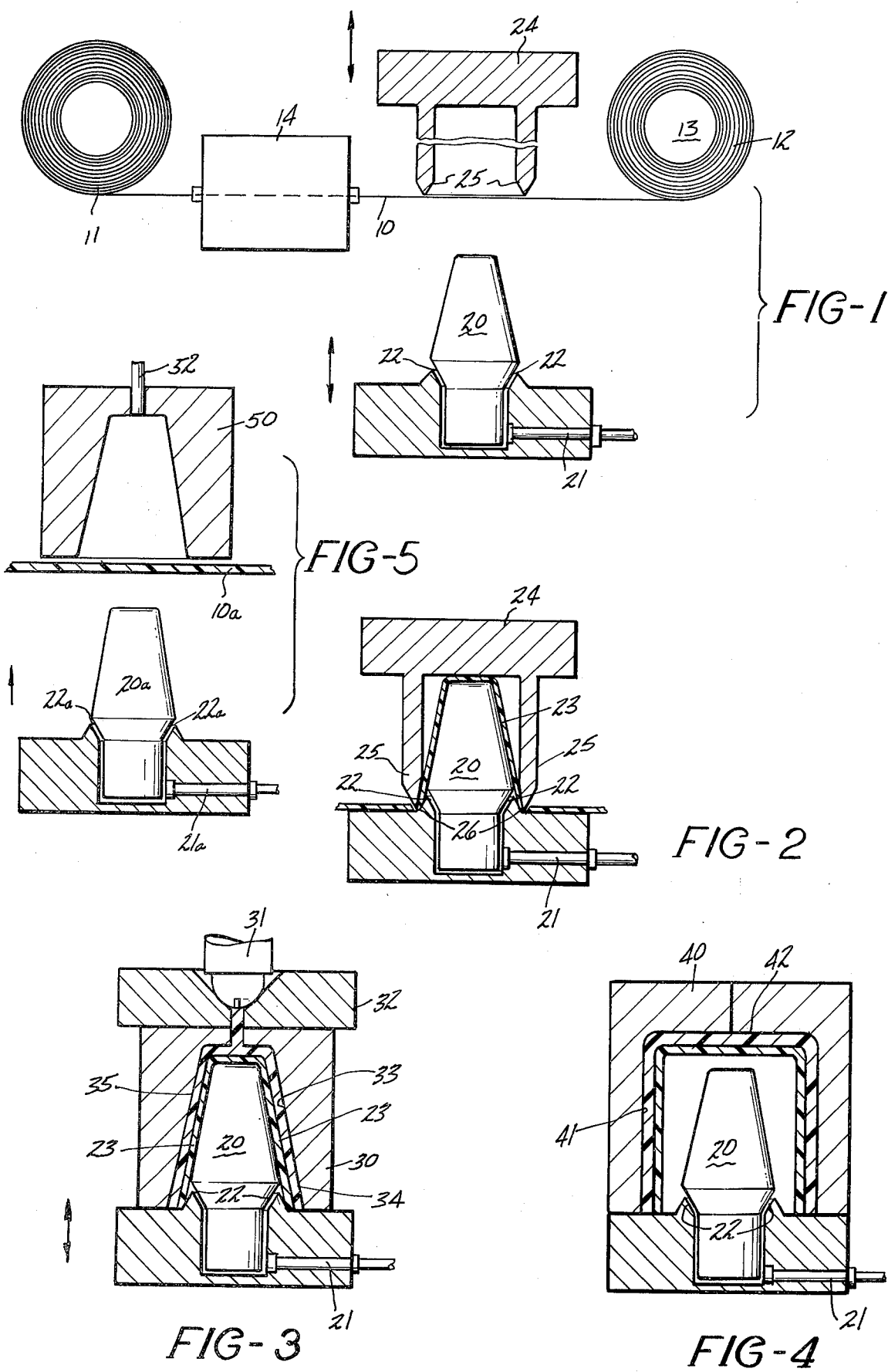

3,939,239

METHOD OF MAKING LINED ARTICLES

CROSS REFERENCE TO RELATED APPLICATIONS

This case is a Continuation-in-Part of copending application Ser. No. 343,498, filed Mar. 21, 1973, now adandoned, which in turn is a Divisional of Ser. No. 186,984, filed Oct. 6, 1971, now U.S. Pat. No. 3,787,157, which in turn is a Continuation-in-Part of Ser. No. 71,734, filed Sept. 14, 1970, now U.S. Pat. No. 3,717,544 and Ser. No. 100,050, filed Dec. 21, 1970, now U.S. Pat. No. 3,719,735.

BACKGROUND OF THE INVENTION

This invention relates to the preparation of plastic containers, especially composite parisons having a preformed inner sleeve or lining, said parisons being useful in the formation of composite blow molded containers as described in my prior U.S. Pats. Nos. 3,719,735 and 3,717,544. According to said patents, previously formed sleeve-like liners are applied to a blow core of an injection blow molding apparatus, plastic is injected around said liners while upon the cores and the resultant composite parison, consisting of the liner and the injected plastic, is expanded together into conformance with a blow mold. The method of injection blow molding is well known and described, for example, in U.S. Pat. No. 3,029,468 and others.

It is desirable to provide a process for obtaining lined, hollow plastic articles using a preformed liner wherein the liner is conveniently and inexpensively obtained in the processing cycle. This will afford one the advantages of the aforesaid process, while enabling the entire process to be carried out in a single processing cycle.

Accordingly, it is a principal object of the present invention to provide an improved process for the preparation of composite plastic containers.

It is a further object of the present invention to provide a process as aforesaid which uses a previously formed sleeve-like liner and which forms the liner in the processing cycle.

Further objects and advantages of the present invention will appear hereinafter.

SUMMARY OF THE INVENTION

In accordance with the present invention, it has now been found that the foregoing objects and advantages may be readily obtained. The present invention relates to a method of making lined, hollow plastic articles wherein a parison is formed on a core, which may be a blow core, in a parison mold by molding plastic around a preformed plastic liner on the core in a parison mold cavity and subsequently expanding the composite parison thus formed in a blow mold to form a composite article. In accordance with the present invention, the liner is formed directly on the core by contacting a web of said plastic with said core and forming said liner on the core using the core as a thermoforming plug or otherwise applying the web to the core, as by suction through the core after the core contacts the web.

Thus, an undeformed web may be brought into juxtaposition with a blow core and the blow core used to form the sleeve from the web, whereby the blow core as well as the web may be suitably heated. The tool by which the sheet or web is drawn may be the blow core. In thermoforming the sleeve in this manner, the end of the sleeve is substantially less deformed than the side walls which are formed by severe drawing with a consequent reduction in thickness.

It can be seen that the process of the present invention is highly advantageous as it inexpensively obtains lined hollow articles having desirable characteristics, and obtains them directly from a web of liner stock in a convenient manner well suited to commercial operations.

BRIEF DESCRIPTION OF DRAWINGS

The nature of the invention will be better understood from the following description taken in conjunction with the accompanying drawings in which specific embodiments have been shown for the purposes of illustration.

In the drawings:

FIG. 1 is a partly schematic view showing a web of liner stock in position to form the liner on the core;

FIG. 2 is a sectional view showing the formation of the liner on the core and severing the formed liner from the web;

FIG. 3 is a sectional view showing the core and liner of FIG. 2 in a parison mold;

FIG. 4 is a sectional view showing the core with parison thereon in blow position within a blow mold having a cavity shaped to form a hollow container or the like; and FIG. 5 is a sectional view showing an alternate method of forming the liner on the core by using the core as a thermoforming plug.

DETAILED DESCRIPTION

Referring to the drawings in more detail, FIG. 1 shows a web 10 of plastic fed from feed reel 11 onto take-up reel 12 by an desired means, such as drive roll 13 on the take-up reel. The web 10 of plastic may be any organic plastic material suitable for formation of a plastic liner in the process of the present invention as described in the aforesaid patents. The web 10 is heated to a temperature at which the plastic material becomes deformable, as by passing the web through heater 14 and then the heated web placed into juxtaposition or alignment with core 20 for formation of the liner, as by feeding the web over the core.

The core used to form the sleeve may be a blow core which is usually heated by conventional means and which, if a blow core, contains fluid passageways 21 communicating with slots 22, for the introduction of fluid pressure or suction to the core. The core is movable axially as shown by the arrow so that it may contact the web 10 and deform the web to correspond in shape to the core and to form liner 23 around the core as shown in FIG. 2. Suction may be applied through fluid passageways 21 and slots 22 or through holes (not shown) communicating with said passageways to aid in drawing the web tightly around the core and holding the formed liner 23 thereon.

The core itself may be used to heat the web, in that case heater 14 may be omitted and the core is held in contact with the web before forming long enough to heat the web to a forming temperature.

As customary in thermoforming, a holding tool 24 is provided, incorporating, with the conventional hold-down ring, a cutting blade 25 in juxtaposition or alignment with both web 10 and core 20. Blade 25 may have a shape corresponding to the base 26 of the liner so that the liner is cut off from the web, as for example, the blade 25 may have a circular shape where the base 26 of the liner is circular. The cutting means is movable axially, as shown by the arrow, into and out of engagement with the base 26 of the liner 23 to sever the liner from the web 10 with the suction applied through fluid passageways 21 and slots 22 aiding in retaining the severed liner 23 on the core 20. The scrap portion of the web 13 is then fed onto roll 12 for reclaiming or otherwise removed from the apparatus. The web may of course take the shape of pre-cut pieces, e.g., discs, placed into juxtaposition with the core by conventional means before forming, as for example shown in U.S. Pat. No. 3,496,597.

The holding tool 24 is then moved out of engagement with the web 10 and the core 20 with liner 23 thereon moved axially in a downward direction for completion of the cycle. Naturally, the core may be positioned above the web and the holding tool below the web and the cycle completed with the core and formed liner moved upwardly. Thus, the entire process can be conducted in a single cycle with the core movable into and out of the various operating cycles as will be described hereinbelow. Axial movement for the core may be used, but other operating cycles may be readily applied to the concept of the present invention, as rotary movement of the core or lateral movement of the core into and out of the various operating positions. Alternatively, a plurality of cores may be used so that a continuous high production rate is obtained.

The liner covered core is then moved into parison mold 30 as shown in FIG. 3. The parison mold 30 communicates with the injection unit 31 by means of a runner plate 32. Parison mold cavity 33 is formed between the parison mold 30 and the core 20 having liner 23 thereon. The assembly is firmly clamped together and hot plastic is pressed into parison mold cavity 33 from injection unit or extruder 31 through runner plate 32 around liner 23 which is on the core 20. A parison 34 is thus molded forming a composite structure the inner layer of which is comprised of the material of the liner 23 while its outer layer 35 is the material pressed around the liner 23 from the extruder 31.

The composite parison 34 is then transferred into the blow mold 40 while still on core 20, as by continuing the axial movement of the core and moving blow mold 40 into alignment therewith, by rotary movement, or in other ways well known in the art. The blow mold 40 has an internal cavity 41 corresponding in shape to the shape of the desired article. The parison will normally be hot enough for blowing upon introduction into the blow mold, although heating means may be provided in the core. The parison is expanded by means of fluid pressure introduced through fluid passageways 21 and slots 22 into conformance with the blow mold cavity 41 to form composite or lined container 42 which may be removed from the blow mold upon separation of the core therefrom. The blow mold may be constructed in two halves to facilitate removal of container 42.

Naturally, numerous variations in container design are possible. For example, a neck mold may be provided for forming a molded neck portion, which neck mold may be used for transferring the parison from the parison mold to the blow mold and thus freeing the first core for a new process cycle while a second core is used to complete the blowing operation.

FIG. 5 shows an alternate method of forming the liner on the core by using the core as a thermoforming plug. In accordance with the embodiment of FIG. 5, heated web 10a is placed in alignment with forming mold 50 and core 20a. The core 20a forms the liner by deforming web 10a into forming mold 50 so that the liner is formed by action of the core 20a on the web 10a in the forming mold 50. If desired, vacuum may be applied through line 52 to aid in drawing the web 10a into mold 50. Line 52 may also be used to apply fluid pressure to the formed liner to aid in release thereof from mold 50 in conjunction with suction applied through passageways 21a and slots 22a.

A wide variety of materials may be used in the present invention. Thus one may select the material of the liner so as to have one of the properties that the finished article is to have and the material of the injected plastic so as to have another of the desired properties. The liner may contain several layers of laminations to provide a liner having the combined properties of several plastics. Typical materials which may be used for the outer portion include polyolefins, polystyrene, polycarbonate, polyvinyl chloride, etc. Typical liner materials include the acetal polymers, polyolefins, ionomer resins, polyallomer copolymers, polystyrene, polyvinylidene chloride, polyvinyl chloride, polycarbonates, acrylonitrile, etc. It is also possible to produce finished articles having a desirable appearance by providing different colors and degrees of transparency in the liner and the material that is injected therearound. The web may also be provided with a decorative pattern or letters, as by printing, for use in conjunction with a transparent injected material.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method of making lined, hollow plastic articles wherein a parison is formed on a core in a parison mold by molding plastic around a pre-formed plastic liner on the core in a parison mold cavity and wherein the parison is subsequently expanded in a blow mold, the improvement which comprises providing a supply of a web of plastic liner material, providing a holding means including a cutting means adjacent said web, bringing said web into juxtaposition with said core and holding means, forming said liner directly on said core by moving said core relative to the web and holding means to engage the web by the core and holding means and form the liner on the core by the core and holding means, said moving also severing the formed liner from the web by the cutting means, transferring the core with the formed, severed liner thereon for subsequent operations, and feeding the balance of the web for scrap reclamation.

2. In a method according to claim 1 wherein the core is a blow core.

3. In a method according to claim 1 including the step of applying suction through said core after the core contacts the web.

4. In a method according to claim 1 wherein said web is deformed by said core to correspond in shape thereto.

5. In a method according to claim 1 wherein said core is used as a thermoforming plug.

6. In a method according to claim 1 wherein said web is heated prior to contacting the core.

7. In a method according to claim 1 wherein said web is heated by said core.

* * * * *